United States Patent
Moritani et al.

[11] Patent Number: 4,774,114
[45] Date of Patent: Sep. 27, 1988

[54] INJECTION STRETCH BLOW CONTAINER

[75] Inventors: Tohei Moritani; Syuji Kawai, both of Kurashiki; Kunihiko Shimamura, Okayama; Toshiaki Sato, Kurashiki, all of Japan

[73] Assignee: Kuraray Co., Ltd., Kurashiki, Japan

[21] Appl. No.: 28,772

[22] Filed: Mar. 23, 1987

Related U.S. Application Data

[63] Continuation-in-part of Ser. No. 916,685, Oct. 8, 1986, abandoned.

[30] Foreign Application Priority Data

Oct. 9, 1985 [JP] Japan .................................. 60-225661

[51] Int. Cl.⁴ .......................... B65D 1/26; C08L 29/04
[52] U.S. Cl. ..................................... 428/35; 215/1 C; 264/537; 525/57; 428/483
[58] Field of Search ....................... 428/35, 480, 483; 215/1 C; 264/537; 525/57

[56] References Cited

U.S. PATENT DOCUMENTS

| | | | |
|---|---|---|---|
| 4,501,781 | 2/1985 | Kushida | 428/35 |
| 4,576,988 | 3/1986 | Tanaka et al. | 524/503 |
| 4,608,286 | 8/1986 | Motoishi et al. | 428/35 |
| 4,613,644 | 9/1986 | Moritani et al. | 524/430 |
| 4,619,849 | 10/1986 | Anzawa et al. | 428/35 |
| 4,636,551 | 1/1987 | Okaya et al. | 525/60 |
| 4,640,870 | 2/1987 | Akazawa et al. | 428/483 |
| 4,645,695 | 2/1987 | Negi et al. | 428/35 |
| 4,675,219 | 6/1987 | Muneki et al. | 428/35 |
| 4,677,006 | 6/1987 | Topolski | 428/35 |

*Primary Examiner*—Henry F. Epstein
*Assistant Examiner*—James J. Seidleck
*Attorney, Agent, or Firm*—Kramer, Brufsky & Cifelli

[57] ABSTRACT

An injection stretch blow container consisting of a combination of 97 to 70 parts by weight of saturated polyester and 3 to 30 parts by weight of a saponification product of an ethylene-vinyl acetate copolymer, said container having many areas, particularly at the body wall portion of said container in each of which areas substantially two-dimensional thin layers of said saponification product of said ethylene-vinyl acetate copolymer are laminated in parallel to the wall surface of said container in a matrix of saturated polyester, said saponification product of said ethylene-vinyl acetate copolymer in said area ($20 \times 20\mu$; vertical section or longitudinal section of the body wall of said container) is 0.001 to 1 $\mu m$ in average thickness and at least 5 in average aspect ratio and the laminated structural index represented by the following formula is at least 5:

Laminated structural index $$I = (1/n) \sum_{i=1}^{\eta} (L_i/h_i),$$

wherein $L_i$ represents a length of the overlapped portion of adjacent layers of the saponification product of the ethylene-vinyl acetate copolymer, and $h_i$ represents a distance between adjacent layers of saponification product of ethylene-vinyl acetate copolymer.

This container has a high gas-barrier quality and is useful as a bottle for carbonated beverages or the like.

20 Claims, 3 Drawing Sheets

INJECTION STRETCH BLOW CONTAINER

This application is a continuation-in-part of application Ser. No. 916,685 filed Oct. 8, 1986, now abandoned.

BACKGROUND OF THE INVENTION

1. Field of the Invention

The present invention relates to an injection stretch blow container having a high gas-barrier quality due to the laminar structure of the blend of a saturated polyester and a saponification product of an ethylene-vinyl acetate copolymer (hereinafter referred to as "EVOH").

2. Description of the Prior Art

With respect to a composition of saturated polyester and EVOH, Japanese Laid-Open Pat. No. 20073/1981 discloses one of such composition, Japanese Laid-Open Pat. No. 76325/1985 discloses a biaxially stretched molded product, and Japanese Laid-Open Pat. No. 148442/1985 discloses a blown bottle.

When containers are produced by the methods disclosed in the above referenced Japanese patents, the gas barrier quality is improved if the amount of EVOH is less than about 30 wt %, but the degree of improvement is too low to be satisfactory in terms of enhancement of the preservability of foodstuffs. On the other hand, if the amount of EVOH is increased in order to improve the preservability, the moldability in during stretch blowing is reduced. Thus, it is difficult to produce the intended gas-barrier container. For these reasons, a container made of a composition of saturated polyester and an EVOH has not yet been put to practical use. It is known that a container having a high gas-barrier quality is obtained by laminating saturated polyester and an EVOH employing a co-extrusion technique, but this method has not been put to practical use either because of the high molding cost.

SUMMARY OF THE INVENTION

Accordingly, it is an object of the present invention to eliminate the above-described problems in the prior art and to provide an injection stretch blow container having a high gas-barrier quality due to the laminar structure of the blend of saturated polyester and an EVOH.

To achieve this aim, the present injection stretch blow container comprising a combination of 97 to 70 parts by weight of a saturated polyester and 3 to 30 parts by weight of a saponification product of an ethylene-vinyl acetate copolymer, having many areas, particularly at the body wall portion of said container, in which substantially two-dimensional thin layers of said saponification product of said ethylene-vinyl acetate copolymer are laminated in parallel to the wall surface of said container in a matrix of saturated polyester, said saponification product of said ethylene-vinyl acetate copolymer in said area (20×20 μm; vertical section or longitudinal section of the body wall of said container) is 0.001 to 1 μm in average thickness and at least 5 in average aspect ratio, and the laminated structural index represented by the following formula is at least 5:

Laminated structural index $$I = (1/n) \sum_{i=1}^{\eta} (L_i/h_i),$$

wherein $L_i$ represents a length of the overlapped portion of adjacent layers of the saponification product of the ethylene-vinyl acetate copolymer, and $h_i$ represents a distance between adjacent layers of the saponification product of the ethylene-vinyl acetate copolymer.

A container having the above-described structure has not been obtained by the methods disclosed in the prior-art literature. A container of the present invention is very useful for packaging a wide range of foods including carbonated beverages, because it has a high gas barrier quality which is equivalent to that of a laminate obtained by the co-extrusion of saturated polyester and the EVOH.

The above and other objects, features and advantages of the present invention will become clear from the following description of the preferred embodiments thereof, taken in connection with the accompanying drawings.

DESCRIPTION OF THE PREFERRED EMBODIMENTS

Figure 1:
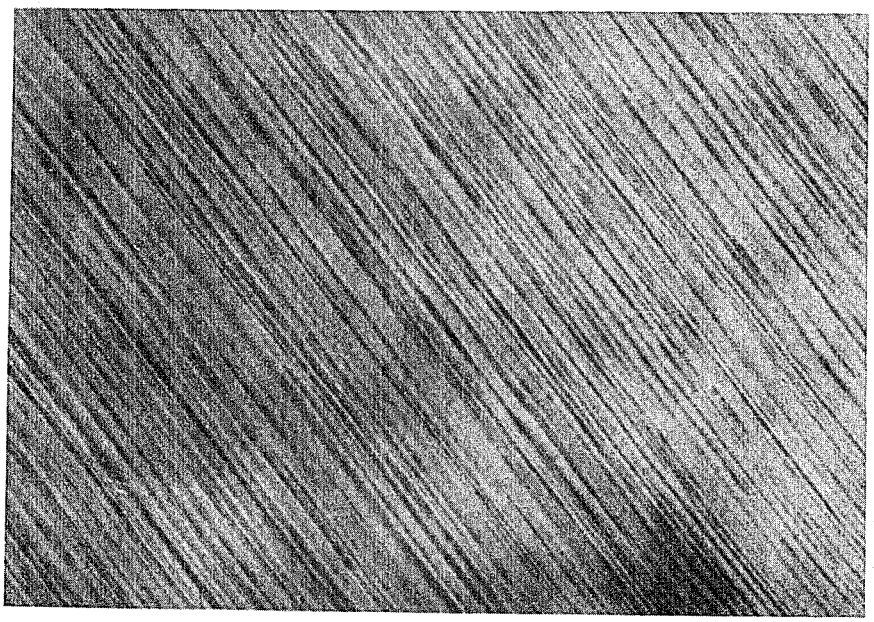
FIG. 1 is a photomicrograph of a vertical section of the body portion of a container according to the present invention.

Examples of saturated polyester resins which are used in the present invention, are as follows: poly(ethylene terephthalate) (PET), poly(butylene terephthalate), poly(ethylene terephthalate/isophthalate), and poly(ethylene glycol/cyclohexanedimethanol/terephthalate). In addition, the above described polymers which contain the following copolymerization components are also usable: diols such as ethylene glycol, cyclohexane dimethanol, neopentyl glycol and pentanediol; dicarboxylic acids such as isophthalic acid, benzophenonedicarboxylic acid, diphenylsulfone dicarboxylic acid, diphenylmethane dicarboxylic acid, propylene bis(phenylcarboxylic acid), diphenyloxide dicarboxylic acid, oxalic acid, malonic acid, succinic acid, glutaric acid, adipic acid, pimelic acid, suberic acid, azelaic acid, sebacic acid, and diethyl succinic acid. Among these, poly(ethylene terephthalate) is usually preferable for achieving the aim of the present invention, and poly(ethylene terephthalate/isophthalate) containing 2 to 12 mol% of isophthalate in a monomer of the acid component is also preferable due to the ease of molding and the excellent gas-barrier property of the container obtained therewith. The intrinsic viscosity of saturated polyester is not specified, but is preferably 0.5 to 1.4 dl/g, more preferably 0.6 to 0.9 dl/g.

The saponification product of ethylene-vinyl acetate copolymer (EVOH) in the present invention may be any product that is obtained by hydrolyzing the vinyl acetate unit of a copolymer of ethylene and vinyl acetate. In particular, a product which contains 25 to 60 mol% of the ethylene unit, the degree of saponification of which is at least 96% and the melt index (at 190° C., 2160 g) of which is in the range of 0.2 to 60 g/10 min. is preferable. Unexpectedly it has been found that a blend composition produced using an EVOH containing 37 to 50 mol % of ethylene units exhibits a propensity of forming a laminar structure in the wall material of the container, thereby displaying a high gas-barrier quality and excellent injection stretch blow moldability. Since an EVOH which has an especially high gas-barrier quality contains 28 to 36 mol% of ethylene, the above finding was not anticipated. The EVOH in the present invention may be modified by a comonomer of less than 5 mol%. Such a modifying monomer will be exemplified by propylene, 1-butene, 1-hexene, 4-methyl-1-pentene, acrylic ester, methacrylate ester, maleic acid, fumaric acid, itaconic acid, higher fatty acid vinyl ester, alkyl vinyl ester, N-(2-dimethylaminoethyl)methacrylamides or their quaternary monomers, N-vinyl imidazole or its quaternary monomer, N-vinyl pyrrolidone, N-n-butoxymethylacrylamide, vinyl trimethoxysilane, vinyl methyl dimethoxysilane, and vinyl dimethyl methoxysilane.

If the amount of EVOH in a composition of the present invention is less than 3 parts by weight, sufficient gas barrier quality is not obtained even if the EVOH is molded into a laminar structure. If the amount of EVOH exceeds 30 parts by weight, it is difficult to obtain a good laminar molded product. According to the method of the present invention, it is not necessary to use such a great amount of EVOH.

In producing a container in accordance with the present invention, a predetermined amount of saturated polyester and EVOH are first blended, preferably by a dry blend method. Pelleting by pre-blending, which is employed in an ordinary polymer blend and which is disclosed in Japanese Laid-Open Pat. No. 76325/1985, is not preferred. However, if pelleting by pre-blending is desired, then by controlling the mixture to an extremely low level, it is possible to obtain a container having a structure as specified in the present invention. In particular, melting and kneading in a multi-axial extruder, kneader, Banbury mixer, etc. will not produce the excellent molding quality of the present invention, thereby being unfavorable for accomplishing the aim of the present invention. The size of the resin being used has a potent influence of the result. A particle size of less than 0.5 mm is not preferable and it is preferable that the shortest side is between 1 mm and 7 mm in order to obtain a good result.

The thus-dry-blended is charged into an extruder, usually, an injection molder provided with a uniaxial extruder, while avoiding additional excessive mixture. It is preferable that this uniaxial extruder has no portion which accelerates mixing such as a mixing screw, DIS screw, and static mixer as a dulmadge, barrier type and pin type screws, respectively, which are generally used in molding polymer blends. The most preferable uniaxial extruder in accordance with the present invention is an extruder which has a simple full-flight type screw having, for example, an L/D of 10 to 30 and a compression ratio of 1.2 to 4. The temperature of injection molding is usually 220° to 330° C., preferably 240° to 280° C. In order to form the excellent laminar structure disclosed in the present invention, specific injection conditions are required. That is, the rotational speed of the screw must be low, 20 to 160, preferably 20 to 100 rpm. It is necessary not to retain the blended resin more than 30 minutes at a temperature above 260° C. If it is retained for more than 30 minutes, it is difficult to form the laminar structure which is characteristic of the present invention, and the stretch blow moldability is reduced. It is necessary that the injection pressure is high (more than 80 kg/cm$^2$, preferably 95 kg/cm$^2$) and the injection time is short (within 3 seconds, preferably 1.5 seconds). It has been found that the laminar structure is rapidly developed by suddenly cooling the injected resin by lowering the temperature of the mold in advance. A suitable temperature to which the mold is cooled is 5° to 18° C. In the present invention it is essential to use an injection molder, and even if a molding method which can avoid additional mixture is used, neither compression molding nor extrusion molding (disclosed in Japanese Laid-Open Pat. No. 121017/1980) can produce a container having a high gas barrier quality such as those disclosed in the present invention. The parison thus obtained by injection molding is stretch-blown, thereby obtaining a container of the present invention. The parison is enlarged 5 to 20 times, preferably 7 to 15 times by stretch blowing at a temperature of 80° to 120° C., preferably 90° to 110° C. The thus-obtained container (bottle or the like) is excellent in resistance to shock and resistance to creep as well as gas-barrier quality, and acquires importance as a container for carbonated beverages such as beer and soda. In order to bottle carbonated beverages, it is necessary not only to prevent the carbon dioxide gas from escaping through the walls of the container but also to prevent the foodstuff within the container from being oxidized by oxygen which may permeate the container. The container of the present invention has an extremely high gas barrier quality. The main characteristic of the present invention is that the EVOH among the wall materials of the container has the above-described laminar structure, which particular structure is considered to be responsible for producing a container having such a high gas-barrier quality. Accordingly, the container of the present invention is easily distinguished from a container in the prior art in that it has the aforementioned laminar structure. This laminar structure is obtained by the above-described specific injection stretch blowing method. The formation of the laminar structure is easily confirmed by observing a section of the container using a transmission electron microscope. The container obtained according to the present invention is characterized in that said container has many areas, particularly at the body wall portion of said container in which substantially two-dimensional thin layers of said saponification product of said ethylene-vinyl acetate copolymer are laminated in parallel to the wall surface of said container in a matrix of saturated polyester, said saponification product of said ethylene-vinyl acetate copolymer in said area (20×20 μm; vertical section or longitudinal section of the body wall of said container) is 0.001 to 1 μm in average thickness, preferably 0.001 to 0.2 μm and is at least 5 in average aspect ratio, preferably at least 15, and the laminated structural index represented by the following formula is at least 5, preferably at least 15.

Laminated structural index $$I = (1/n) \sum_{i=1}^{\eta} (L_i/h_i),$$

configurations similar to those of the EVOHs in Comparative Example 1, and displayed a lamellar structure 2 to 6 in average aspect ratio and 0.8 to 4.4 in laminated structural index, which was very different from the laminar structure of the container of the present invention.

in the above-described way, it showed excellent preservability; the $CO_2$ 15% loss was 44 weeks and the $O_2$ concentration 3 ppm was 37 weeks. Further this bottle had a favorable external appearance and an excellent strength in drop and pressure resistance. The EVOH at the body portion of the bottle exhibited a distinct lami-

TABLE 1

| | Blend Structure PET/EVOH | Preservability (week) | | | Composition of EVOH of Body of Container | | | |
|---|---|---|---|---|---|---|---|---|
| | | | | | Average Aspect Ratio | | Laminated Structure Index | |
| | | $CO_2$ 15% loss | $O_2$ Concentration 3 ppm | Average Thickness μm | Vertical Section | Longitudinal Section | Vertical Section | Longitudinal Section |
| Example 1 | 90/10 | 40 | 35 | 0.003~0.03 | more than 100 | more than 100 | more than 30 | more than 30 |
| Comparative Example 1 | 90/10 | 15 | 13 | 0.03~0.07 | 3~6 | 4~7 | 0.8~2.5 | 0.7~2.6 |
| Comparative Example 3 | 90/10 | 13 | 11 | 0.1~0.3 | 2~5 | 3~6 | 0.8~3.8 | 0.9~4.4 |

Average Thickness ... the average thickness of the EVOH layers on the vertical section and the longitudinal section (section in the diametrical direction) of the body wall of the container in each area (20 × 20 μm). (Minimum average thickness to maximum average thickness).
Average Aspect Ratio ... the average ratio of the length to the thickness of the EVOH layers on the vertical section and the longitudinal section of the body wall of the container represented by $1/n \sum_{i=1}^{n} (l_i/t_i)$ wherein $l_i$ represents the length of the EVOH layer, and $t_i$ the thickness thereof in each area (20 × 20 μm).

Figure 5:
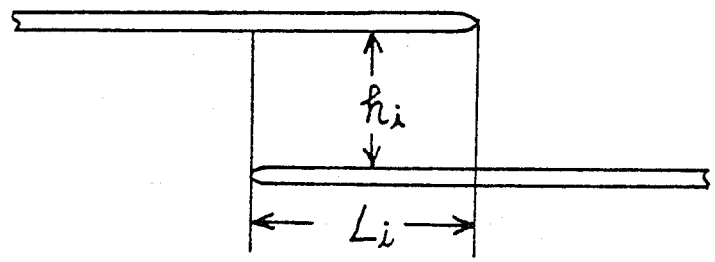
FIG. 5 is a schematic view of the laminated structural index.

(Minimum average ratio to maximum average ratio).
Laminated Structural Index ... the average ratio of the distance (hi) between adjacent EVOH layers to the length (Li) of the overlapped portion on the vertical section and the longitudinal section of the body wall of the container represented by $1/n \sum_{i=1}^{n} (L_i/h_i)$ in each area (20 × 20 μm). (Minimum average ratio to maximum average ratio). FIG. 5 is a schematical view thereof.

EXAMPLES 2 TO 6

Injection stretch blow containers were obtained in the same way as in Example 1 except for changing the kinds and the amount of EVOH to be blended. Table 2 shows the results of measurement of the preservabilities and observation of the wall structures. Each of these bottles had a favorable external appearance and had approximately the same strength in drop and pressure resistance as that of the container consisting solely of PET. In addition, each of these bottles displayed high preservability, as shown in Table 2, and is therefore suitable as a container for carbonated beverages.

nar structure consisting of a multiplicity of substantially two-dimensional layers in the matrix of saturated polyester. The average thickness of the layers was 0.001 to 0.1 μm, the average aspect ratio was more than 100, and the laminated structural index was more than 30.

We claim:
1. An injection stretch blow container comprising a combination of 97 to 70 parts by weight of saturated polyester and 3 to 30 parts by weight of a saponification product of an ethylene-vinyl acetate copolymer, said container having many areas, particularly at the body wall portion of said container in which substantially two-dimensional thin layers of said saponification prod-

TABLE 2

| | EVOH | | Blend Structure PET/ EVOH | Preservability (week) | | Composition of EVOH of Body of Container | | | | |
|---|---|---|---|---|---|---|---|---|---|---|
| | Et*1 | MI*2 | | $CO_2$ 15% loss | $O_2$ Concentration 3 ppm | Average Thickness μm | Average Vertical Section | Aspect Ratio Longitudinal Section | Laminated Vertical Section | Structure Index Longitudinal Section |
| Example 2 | 44 | 5 | 95/5 | 25 | 22 | 0.002~0.2 | more than 100 | more than 100 | more than 30 | more than 30 |
| Example 3 | 44 | 8 | 80/20 | 67 | 58 | 0.002~0.2 | more than 100 | more than 100 | more than 30 | more than 30 |
| Example 4 | 48 | 8 | 75/25 | 69 | 61 | 0.001~0.1 | more than 100 | more than 100 | more than 30 | more than 30 |
| Example 5 | 37 | 3 | 90/10 | 39 | 34 | 0.001~0.1 | 50~120 | more than 100 | 10~30 | more than 30 |
| Example 6 | 33 | 1 | 90/10 | 25 | 21 | 0.005~0.5 | 5~80 | 10~100 | 5~20 | 5~25 |

*1Et: content (mol %) of ethylene unit
*2MI: melt index (at 190° C., 2160 g) (g/10 min.)

EXAMPLE 7

90 parts of dried pellets (size: 2×2×4 mm) of poly-(ethylene terephthalate/isophthalate) having 6 mol % of isophthalate in monomers of the acid component, and an intrinsic viscosity of 0.82 dl/g and 10 parts of the same pellets of the EVOH as used in Example 1 were dry blended. Thereafter the blend was injected into a mold by the same stretch bottle blower as used in Example 1 under the same conditions as those of Example 1 except that the temperatures of the cylinders $C_1$, $C_2$ and $C_3$ were 247° C., 256° C. and 256° C., respectively. Thus a bottle-shaped container having a capacity of 1 l was obtained. When this bottle was filled with saturated calcareous water ($O_2$ concentration: 0 ppm) so as to be 2 atm at 20 C. and the preservation term was measured uct of said ethylene-vinyl acetate copolymer are laminated in parallel to the wall surface of said container in a matrix of saturated polyester, said saponification product of said ethylene-vinyl acetate copolymer in said area (20×20 μm; vertical section or longitudinal section of the body wall of said container) is 0.001 to 1 μm in average thickness and is at least 5 in average aspect ratio, and the laminated structural index represented by the following formula is at least 5:

Laminated structural index $$I = (1/n) \sum_{i=1}^{n} (L_i/h_i),$$

wherein $L_i$ represents a length of the overlapped portion of adjacent layers of the saponification product of the ethylene-vinyl acetate copolymer, and $h_i$ represents a distance between adjacent layers of the saponification product of the ethylene-vinyl acetate copolymer.

At least the body portion of the container must have many of such areas. The shoulder portion, neck portion, and bottom of the container need not necessarily have that structure.

Although an injection-molded container which is formed solely of a composition of saturated polyester and an EVOH has been explained in the above, a multi-layered injection-molded container which contains a saturated polyester layer (P) in addition to the blend layer (B) is included in the scope of the present invention. The structure of the layer in this case is preferably P/B (outer layer), B/P (outer layer), or P/B/P, and it is usually unnecessary to use a bonding resin.

It is possible to add another thermoplastic resin, antioxidant, pigment, filler, nucleating agent, etc., to the composition of the present invention in a range which does not impair the object of the present invention.

The present invention will be explained in more detail with reference to the following examples.

EXAMPLE 1

90 parts of pellets (size: 2×2×4 mm) of polyethylene terephthalate (hereinafter referred to as "PET") having an intrinsic viscosity of 0.80 dl/g were dried under reduced pressure so as to have a water content of not greater than 50 ppm. 10 parts of pellets (size: 2×3×4 mm) of an EVOH in which the ethylene units were 44 mol %, the degree of saponification was 99% and the melt index (at 190° C., 2160 g) was 5 g/10 min. were dried under a reduced pressure so as to have a water content of not greater than 200 ppm. A stretch bottle blower having an extruder with a built-in full-flight screw (L/D: 20, diameter: 36 mm, effective length: 720 mm, compression ratio: 2.5) was prepared. After dry blending both pellets, they were injected into a mold which was provided with an injection gate having a diameter of 2.1 mm and which had been cooled to 9° C. at an injection pressure of 100 kg/cm². The temperature of the cylinders $C_1$, $C_2$ and $C_3$ were 268° C., 273° C. and 273° C., respectively, and the rotational speed of the screw was 80 rpm. The pellets were retained in the extruder for 2.5 minutes. The injection time was 1.5 seconds, and the injection holding time was 9 seconds. Thus, a closed-end parison (total length: 165 mm, outer diameter: 24 mm, inner diameter: 16 mm) was molded. Immediately thereafter the parison was held at 100° C. for 15 seconds. Stretch blow molding (draw ratio by stretching: about 10) was then carried out, whereby a bottle-shaped container having the body portion of 380μ thick and a capacity of 1 l was obtained.

Comparative Example 1

Dry-blended materials having the same composition as those of Example 1 were blend-pelleted at 280° C. using a biaxial extruder (40φ). This blended pellet was used and a stretch blow bottle was obtained under the same molding conditions as in Example 1.

Comparative Example 2

Dry-blended materials having the same composition as those of Example 1 were extruded using the same uniaxial extruder in the same way as in Example 1 except that the residence was 40 minutes, thereby stretch blowing the molded parison, but it was impossible to obtain a uniformly blown product.

Comparative Example 3

Dry-blended materials having the same composition as those of Example 1 were extruded using uniaxial extruder (40φ) with a circular hollow pipe die at 280° C. (the residence time in the extruder and die: 4.5 minutes), thereby obtaining a pipe having an outer diameter of 24 mm and an inner diameter of 16 mm. This pipe was cut to form a mouth portion and a bottom using a LM-01 and 02, produced by Corpoplast Ltd, so that a parison of 165 mm in total length was obtained. The parison was then preheated at 100° to 110° C. for 30 minutes by an infrared heater and thereafter it was stretch blown by an LD-01 type stretch blow extruder produced by Corpoplast Ltd, whereby a bottle havin abody portion of 380μ in average thickness and a capacity of 1 l was obtained.

The three kinds of bottles obtained in Example 1, and Comparative Examples 1 and 3 were filled with saturated $CO_2$ water ($O_2$ concentration: 0 ppm) so as to be 2 atm at 20° C. and were kept at 20° C. in an atmosphere of 65% RH. The concentrations of $CO_2$ and $O_2$ were measured by a gas chromatograph and the changes thereof were recorded. The time at which the $CO_2$ concentration was reduced by 15% of that present at the initial time (hereinafter referred to as "$CO_2$ 15% loss") and the time at which the $O_2$ concentration became 3 ppm (hereinafter referred to as "$O_2$ concentration 3 ppm") were made the criteria for the foodstuff preservability. The results are shown in Table 1. Table 1 also shows the results of observation of the wall structures of the containers using a light microscope and an electron microscope. As will be clear from Table 1, the preservation time of the container in accordance with the present invention in terms of $CO_2$ 15% and $O_2$ concentration 3 ppm is 2.7 to 3 times those of the containers of blend compositions of Comparative Examples 1 and 3. Further, the bottle obtained according to Example 1 had a favorable external appearance and had an excellent strength in drop and pressure resistance.

Figure 2:
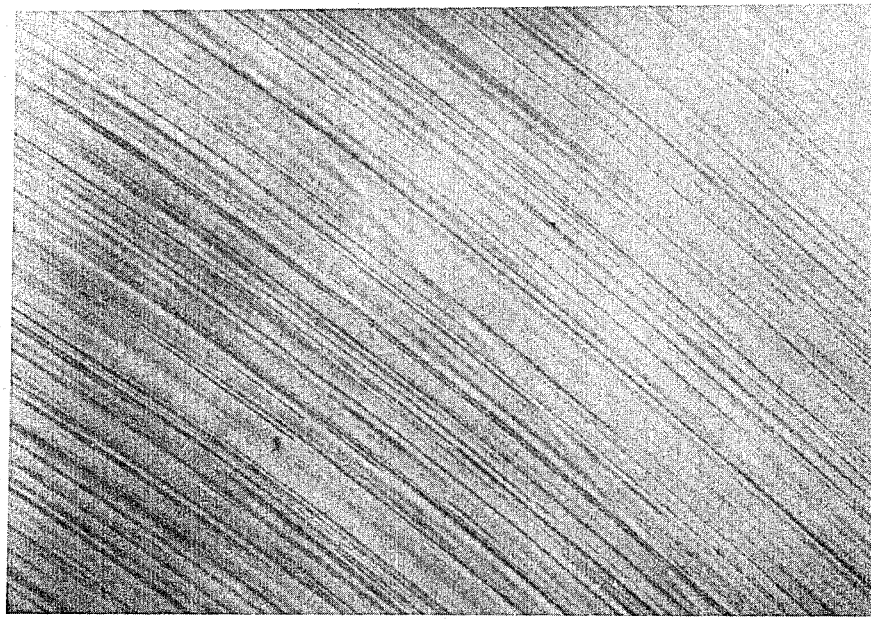
FIG. 2 is a photomicrograph of a longitudinal section of the body portion of a container according to the present invention.

It is to be noted that the preservation time of the container of the present invention is much longer than those of the containers of Comparative Examples 1 and 3. FIGS. 1 and 2 are photomicrographs (20,000×magnification) taken with a transmission electron microscope of a vertical section and a longitudinal section, respectively of the body portion of a bottle. It is understood from these photomicrographs that the EVOH exhibits a laminar structure consisting of a multiplicity of distinct substantially two-dimensional layers in the matrix of saturated polyester. Many areas (each area is 20×20 μm) were observed. The average thickness of the layers was 0.001 to 0.03 μm, the average aspect ratio was more than 100, and the laminated structural index was more than 30.

Figure 3:
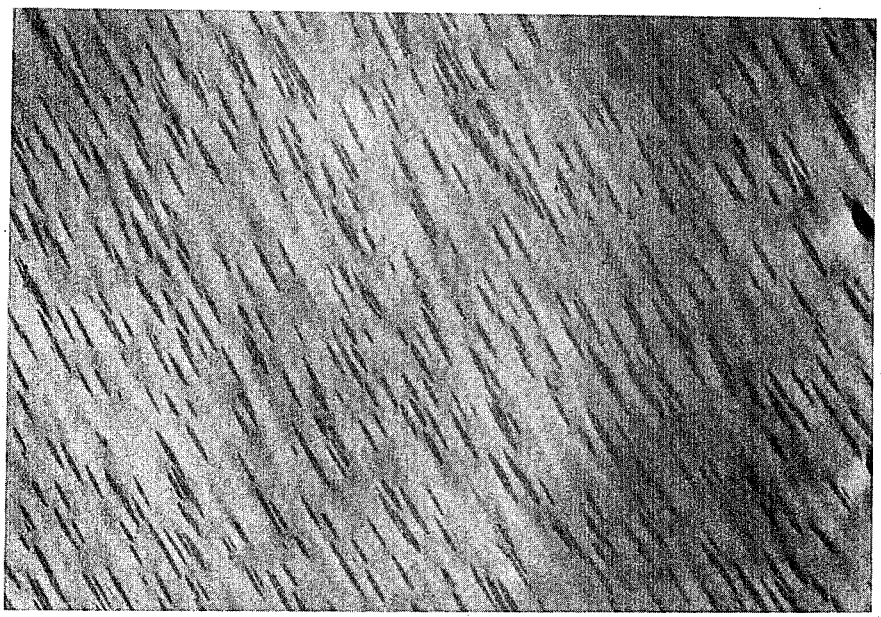
FIG. 3 is a photomicrograph of a vertical section of the body portion of a comparative container in accordance with Comparative Example 1.
Figure 4:
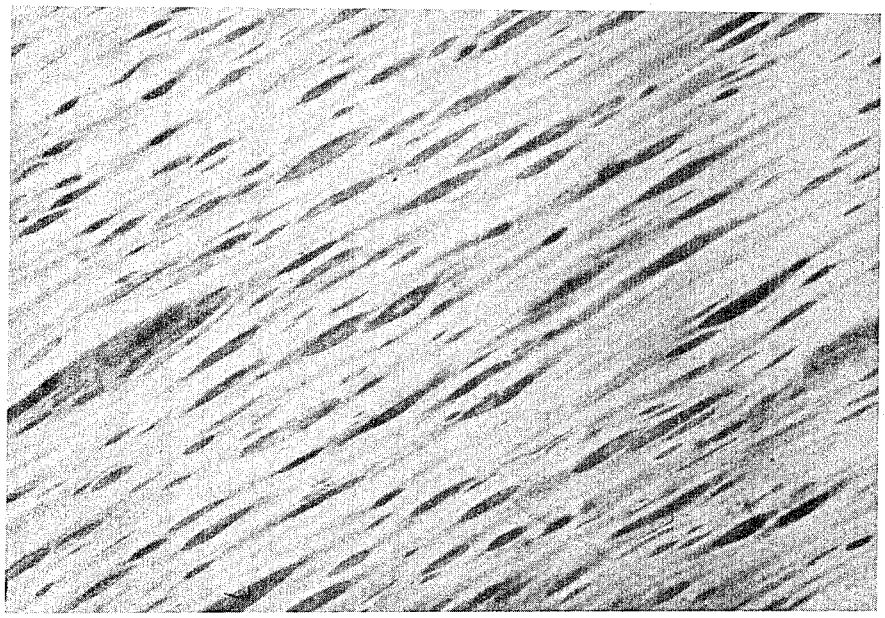
FIG. 4 is a photomicrograph of a longitudinal section of the body portion of a comparative container in accordance with Comparative Example 1.

According to the photomicrographs by an electron microscope (FIG. 3 shows a vertical section, and FIG. 4 shows a longitudinal section), the EVOHs dispersed in the wall of the container of Comparative Example 1 were flat and particulate, or displayed a lamellar structure 3 to 7 in average aspect ratio and 0.8 to 2.6 in laminated structural index, which was very different from the laminar structure of the container of the present invention. According to the photomicrographs taken using an electron microscope, the EVOHs dispersed in the wall of the container of Comparative Example 3 had wherein $L_i$ represents a length of the overlapped portion of adjacent layers of said saponification product of said ethylene-vinyl acetate copolymer, and $h_i$ represents a distance between adjacent layers of said saponification product of said ethylene-vinyl acetate copolymer.

2. A container according to claim 1, wherein said saponification product of said ethylene-vinyl acetate copolymer contains 25 to 60 mol% of ethylene vinyl units and the degree of saponification of acetic vinyl unit is at least 96%.

3. A container according to claim 1, wherein said saponification product of said ethylene-vinyl acetate copolymer contains 37 to 50 mol% of ethylene vinyl units and the degree of saponification of the acetic vinyl unit is at least 96%.

4. A container according to claim 1, wherein said saturated polyester is polyethylene terephthlate.

5. A container according to claim 1, wherein said saturated polyester is poly(ethylene terephthalate/isophthalate) which contains 2 to 12 mol% of isophthalic acid in a monomer of an acid component.

6. A container according to claim 1, wherein said container has many areas, particularly at the body wall portion of said container, in which substantially two-dimensional thin layers of said saponification product of said ethylene-vinyl acetate copolymer are laminated in parallel to the wall surface of said container in a matrix of saturated polyester, said saponification product of said ethylene-vinyl acetate copolymer in said area (20×20 μm; vertical section or longitudinal section of the body wall of said container) is 0.001 to 0.2 μm in average thickness and is at least 10 in average aspect ratio, and the laminated structural index is at least 15.

7. A container according to claim 1, wherein the draw ratio of stretch blow is 5 to 20.

8. A container according to claim 2, wherein the saturated polyester is polyethylene terephthalate.

9. A container according to claim 3, wherein the saturated polyester is polyethylene terephthalate.

10. A container according to claim 2, wherein said saturated poly(ethylene terephthalate/isophthalate) which contains 2 to 12 mol % of isophthalic acid in a monomer of an acid component.

11. A container according to claim 3, wherein said saturated poly(ethylene terephthalte/isophthalate) which contains 2 to 12 mol % of isophthalic acid in a monomer of an acid component.

12. A container according to claim 2, wherein said container has many areas particularly at the body wall portion of said container in which substantially two-dimensional thin layers of said saponification product of said ethylene-vinyl acetate copolymer are laminated in parallel to the wall surface of said container in a matrix of saturated polyester, said saponification product of said ethylene-vinyl acetate copolymer in said area (20×20 m; vertical section section or longitudinal section of the body wall of said container) is 0.001 to 0.2 μm in average thickness and at least 10 in average aspect ratio, and the laminated structural index is at least 15.

13. A container according to claim 3, wherein said container has many areas particularly at the body wall portion of said container in which substantially two-dimensional thin layers of sid saponification product of said ethylene-vinyl acetate copolymer are laminated in parallel to the wall surface of said container in a matrix of saturated polyester, said saponification product of said ethylene-vinyl acetate copolymer in said area (20×20 μm; vertical section or longitudinal section of the body wall of said container) is 0.001 to 0.2 μm in average thickness and at least 10 in average aspect ratio, and the laminated structural index is at least 15.

14. A container according to claim 4, wherein said container has many areas particularly at the body wall portion of said container in which substantially two-dimensional thin layers of said saponification product of said ethylene-vinyl acetate copolymer are laminated in parallel to the wall surface of said container in a matrix of saturated polyester, said saponification product of said ethylene-vinyl acetate copolymer in said area (20×20 m; vertical section or longitudinal section of the body wall of said container) is 0.001 to 0.2 μm in average thickness and at least 10 in average aspect ratio, and the laminated structural index is at least 15.

15. A container according to claim 5, wherein said container has many areas particularly at the body wall portion of said container in which substantially two-dimensional thin layers of said saponification product of said ethylene-vinyl acetate copolymer are laminated in parallel to the wall surface of said container in a matrix of saturated polyester, said saponification product of said ethylene-vinyl acetate copolymer in said area (20×20 m; vertical section or longitudinal section of the body wall of said container) is 0.001 to 0.2 μm in average thickness and at least 10 in average aspect ratio, and the laminated structural index is at least 15.

16. A container according to claim 2, wherein the draw ratio of stretch blow is 5 to 20.

17. A container according to claim 3, wherein the draw ratio of stretch blow is 5 to 20.

18. A container according to claim 4, wherein the draw ratio of stretch blow is 5 to 20.

19. A container according to claim 5, wherein the draw ratio of stretch blow is 5 to 20.

20. A container according to claim 6, wherein the draw ratio of stretch blow is 5 to 20.

* * * * *

UNITED STATES PATENT AND TRADEMARK OFFICE
CERTIFICATE OF CORRECTION

PATENT NO. : 4,774,114
DATED : September 27, 1988
INVENTOR(S) : Moritani et al

It is certified that error appears in the above-identified patent and that said Letters Patent is hereby corrected as shown below:

In the abstract, line 6 of the patent, delete "in each of which areas" and substitute--in which--therefore.

In the abstract, line 12 thereof, delete the measurement "20X20u" and insert in lieu thereof--20X20um--.

In the abstract, at approximately line 20 thereof, delete from the formula the variable "η" and insert in lieu thereof--n--.

In the specification, column 1, line 29 thereof, delete "in".

In the specification, Column 1, approximately line 65 thereof, delete from the formula the variable "η" and insert in lieu thereof--n--.

In the specification column 3, line 51 thereof, insert --resin--after "thus-dry-blended".

In the specification, column 4, approximately line 65 thereof, delete from the formula the variable "η" and in lieu thereof insert --n--.

UNITED STATES PATENT AND TRADEMARK OFFICE
CERTIFICATE OF CORRECTION

PATENT NO. : 4,774,114

DATED : September 27, 1988

INVENTOR(S) : Moritani et al

It is certified that error appears in the above-identified patent and that said Letters Patent is hereby corrected as shown below:

In the specification, column 5, line 56 thereof, delete "380u" and insert in lieu thereof --380μm--.

In the specification, column 6, line 7 thereof, insert --a-- after "using".

In the specification, column 6, line 18 thereof, delete "havin abody" and insert in lieu thereof --having a body--.

In the specification, column 6, line 18 thereof, delete "380u" and insert in lieu thereof --380μm--.

In the specification, column 6, line 58 thereof, delete "by" and insert in lieu thereof --taken with--.

In the specification, column 8, approximately line 65 thereof, delete the variable "η" and insert in lieu thereof --n--.

In Claim 5, column 9, line 21 thereof, delete "osphthalate" and insert in lieu thereof --sophthalate--.

UNITED STATES PATENT AND TRADEMARK OFFICE
CERTIFICATE OF CORRECTION

PATENT NO. : 4,774,114

DATED : September 27, 1988

INVENTOR(S) : Moritani et al

It is certified that error appears in the above-identified patent and that said Letters Patent is hereby corrected as shown below:

In Claim 12, column 10, line 3 thereof, delete "20X20m" and insert in lieu thereof --20X20μm--.

In Claim 12, column 10, line 3 thereof, delete "section" at the first occurrence.

In Claim 13, column 10, line 11 thereof, delete "sid" and insert in lieu thereof --said--.

In Claim 14, column 10, line 28, delete "20X20m" and insert in lieu thereof --20x20μm--.

In Claim 15, column 10, line 40 thereof, delete "20X20m" and insert in lieu thereof --20x20μm--.

Signed and Sealed this

Thirteenth Day of June, 1989

Attest:

DONALD J. QUIGG

Attesting Officer

Commissioner of Patents and Trademarks